United States Patent [19]
Carretto

[11] Patent Number: 5,307,440
[45] Date of Patent: Apr. 26, 1994

[54] ELECTRICALLY HEATED STEAM GENERATOR WITH A PROPORTIONALLY CONTROLLED STEAM AND POWER TAKE-OFF FOR SUPPLYING STEAM AND ELECTRIC POWER TO AN EXTERNAL USER

[75] Inventor: Emanuel Carretto, Bergamo, Italy
[73] Assignee: S.T.E.M. S.R.L., Bergamo, Italy
[21] Appl. No.: 899,675
[22] Filed: Jun. 15, 1992

Related U.S. Application Data

[63] Continuation-in-part of Ser. No. 664,772, Mar. 5, 1991, abandoned.

[51] Int. Cl.⁵ .................. H05B 1/02; D06F 75/10; F22B 1/28
[52] U.S. Cl. .................. 392/402; 38/75; 38/77.6; 219/485; 392/401
[58] Field of Search ............ 219/485; 392/394, 400, 392/401, 402, 403; 38/75, 77.1, 77.3, 77.6, 77.7

[56] References Cited

U.S. PATENT DOCUMENTS

| | | | |
|---|---|---|---|
| 1,194,165 | 8/1916 | Fry | 219/485 |
| 1,220,979 | 3/1917 | Gregory | 137/599 |
| 1,576,568 | 3/1926 | Brewer | 392/400 |
| 2,821,210 | 1/1958 | Liley | 137/599 |
| 3,010,316 | 11/1961 | Snyder | 137/599 |
| 4,480,173 | 10/1984 | Butterfield | 392/401 |
| 4,878,458 | 11/1989 | Nelson | 392/400 |

Primary Examiner—Anthony Bartis
Attorney, Agent, or Firm—Ladas & Parry

[57] ABSTRACT

A steam generator for domestic and industrial use, of the type which has a boiler (5) provided with a resistance heater element (17) and a steam and energy take-off unit (10) for supplying steam and electrical power to an external user item, such as a smoothing iron. At least a first solenoid valve (7) and a second solenoid valve (8) are connected between the boiler (5) and the take-off unit (10) to give rise to at least three separate levels of output steam rate. An electronic controller is coupled to the resistance heater element (17), steam and electrical power take-off unit (10), the power source and the solenoid valves (7,8) for automatically and proportionally exchanging electrical power applied to the resistance heater element (17) with electrical power applied to the external user item, thereby effectively exchanging the amount of steam available for use by, and the electrical power applied to, the external user item.

1 Claim, 5 Drawing Sheets

ELECTRICALLY HEATED STEAM GENERATOR WITH A PROPORTIONALLY CONTROLLED STEAM AND POWER TAKE-OFF FOR SUPPLYING STEAM AND ELECTRIC POWER TO AN EXTERNAL USER

CROSS-REFERENCE TO RELATED APPLICATIONS

This application is a continuation-in-part application of Applicant's prior U.S. App. No. 07/664,772 filed Mar. 5, 1991, now abandoned.

BACKGROUND OF THE INVENTION

1. Field of the Invention

This industrial invention relates to a steam generator for domestic and industrial use. More particularly, the present invention provides a steam generator which enables the user to obtain maximum steam efficiency and minimum wastage of electrical energy.

2. Brief Description of the Prior Art

Steam generator which can be used for distributing steam to a plurality of appliances, non-limiting examples of which are a smoothing iron, general cleaning appliances, saunas, humidifiers, etc., are well-known, examples being devices such as shown and described in U.S. Pat. Nos. 1,576,568; 4,480,173; and 4,878,458; and Italian Patent Application No. 2927/A87 which matured into Italian Patent No. 1,218,483 on Apr. 19, 1990. Italian Patent No. 1,218.483 is incorporated herein by reference. Such steam generators have given excellent industrial results but require the availability of an electrical system able to sustain sudden absorbed current increases to an extent not always possible in the case of normal users. These absorbed current increases are due to the fact that when the generator is used for feeding steam to appliances which themselves absorb electrical energy, such as a smoothing iron, switching on the appliance results in a current increase and, as stated, implies the need for a large installed power availability. A further limitation is that in order to ensure that the electromechanical pressure switch retains its reliability with time, it is not possible for constructional reasons to reduce the operating pressure hysteresis to a minimum. Finally, prior art steam generators for home or light industrial use have only two levels of steam output; full on or completely closed off. No selection in the amount of steam can be easily made by the user.

SUMMARY OF THE INVENTION

An object of the present invention is to provide a steam generator which does not suffer from the aforesaid drawbacks.

Specifically, in the steam generator according to the invention: a) the maximum operating pressure is regulated by a hysteresis-free pressure switch, i.e. free from on-off hysteresis, with consequent constant operating pressure without surges due to hysteresis; b) the power of the resistance heater element of the generator is reduced when the heater element of another appliance connected to the generator is switched on, such as a smoothing iron or the like, thus resulting in constant mains energy consumption without sudden increases due to the switching on of the appliance; c) an indication is given by visual and/or acoustic or other means when the pressure is sufficient for use; d) a device can be provided for reducing the heating power of the generator (energy saving); e) means are provided for interrupting the electrical energy feed to the generator after a predetermined time of operation without water; and f) means are provided to give the user a selection of available steam output rates.

These and further objects of the invention will be apparent to the expert in the art upon reading the following description. The steam generator for domestic and industrial use is of the type comprising a boiler provided with a resistance heater element and a steam and energy take-off unit, and comprises at least a first and a second solenoid valve or equivalent connected between the boiler and the take-off unit, the generator comprising an electronic controller card for controlling the generator operation.

BRIEF DESCRIPTION OF THE DRAWING

The steam generator according to the present invention is illustrated by way of non-limiting example in the figures of the accompanying drawings, in which.

DETAILED DESCRIPTION OF THE PREFERRED EMBODIMENT

Figure 1:
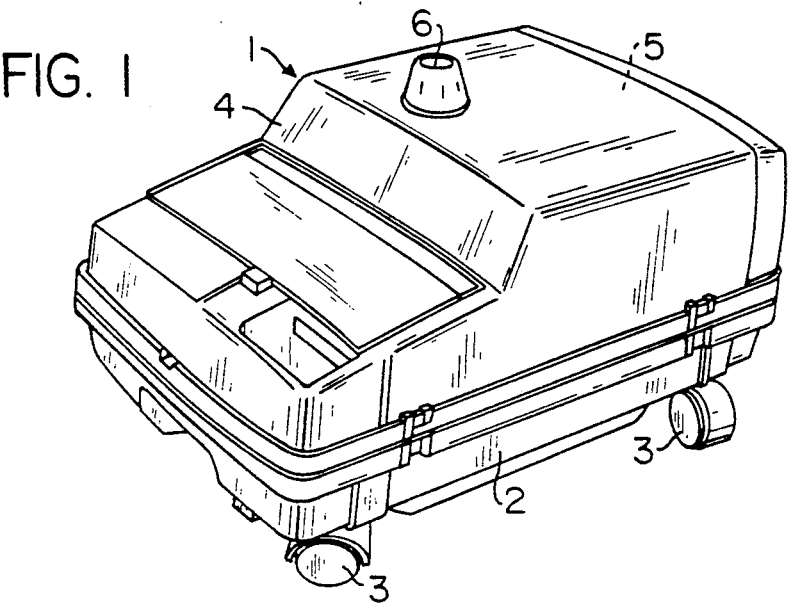
FIG. 1 is an overall perspective view of the generator.

With reference to the figures, the generator, indicated overall by 1, comprises essentially a base 2 provided with castors 3, and a cover 4.

In the base 2 there is mounted a boiler 5, of the type described in said Italian Patent No. 1,218,483, suitably covered with insulating material and provided with a filing cap 6 with a double-acting safety valve (not shown).

Figure 4:
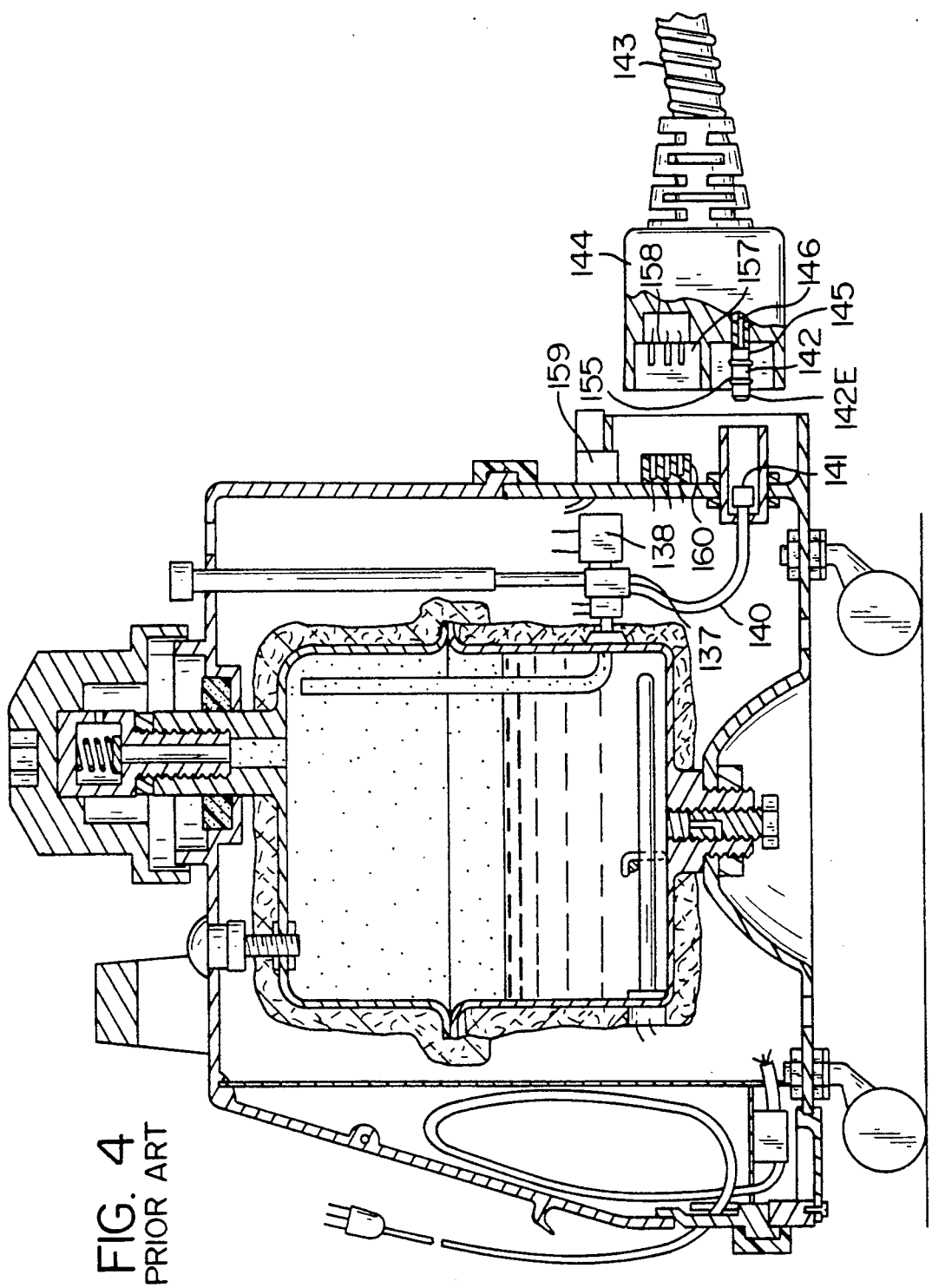
FIG. 4 is a side elevation view of a prior art steam generator showing a steam and power take-off unit device.
Figure 5:
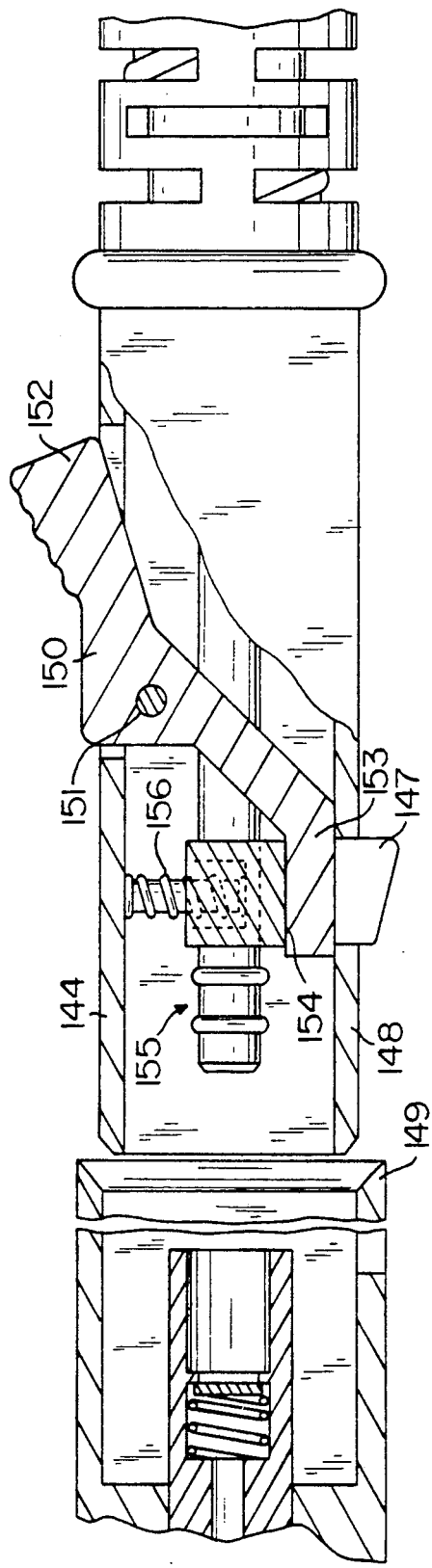
FIG. 5 is a cross-sectional view of the steam and power connections at the steam and power take-off unit of FIG. 4.

To assist in the understanding of the manner in which steam and power may be taken off a boiler unit, the following description refers to FIGS. 4 and 5 showing the steam and power take-off unit according to the aforementioned Italian Patent No. 1,218,483 which is prior art relative to the present invention.

A flexible rubber tube 140 is located at the exit of tap 137 and intended to convey steam to a further check valve 141, which will open when the coupling with a complementary male member 142 is effected, the member pertaining to a particular plug 144 integral with the end of a utilizing tube 143. Plug 155 is formed by a male member 142 bearing externally two sealing rings 145 ("O" Ring type) engaging with the cylindric recess of the valve intended to receive said male coupling member 142, the male member opening the aperture of the check valve 141 through the thrust exerted by its extremity 142E; in this way steam can flow from said valve 141 to the interior of a hole 146 axial with said male member 141 and from there pass to the interior of the flexible utilizing tube 143. The axial constraint between the two parts, which is necessary inasmuch as they convey a fluid under pressure, is representsd by a tooth 147 (FIG. 5). This tooth yieldably retracts in respect of the reference plane 148 when it is pressed against the inclined guiding surface 149 during the coupling operation and/or when it is raised by a first lever 150 fulcrumed at 151 and operated at a protruding portion 152. Said lever 150 causes the tooth 147 to be raised by its reactive end 153. This end is forked so as to house interiorly an extension of the tooth body provided with shoulders 154. The tooth body extension is provided with a recess to contain a spring 156 reacting on the body of the plug 144 to push the tooth body externally until the boundary imposed by the interposition of the end 153 between the shoulders 154 and the lower body of the plug 144. This plug 144, besides representing a means for connecting the steam tubes, is intended to bring about also the electric connection between the utilizing fitting and the body of the generating apparatus including the boiler. This electric connection is necessary when the user is provided with a pushbutton for controlling the electrovalve 138; e.g. a smoothing iron, a pavement-washing brush etc. When using a fitting requiring electric power for its intrinsic operation, other electric cables have to be connected by the plug; this is the case of steam smoothing irons, which require two conductors for the heating of its plate and two further conductors for controlling the electrovalve provided for the steam inflow, and, obviously, the conductor(s) for the grounding. This electric connection is provided by conventional electric male-female means, with the peculiarity that the female is formed by a "block" of a certain number of holes (e.g. six) supplied with voltage, and the male by pins whose number and position is such as to satisfy the needs. In fact, each user (smoothing iron, brush etc.) is provided with its own plug which differs from those of other user fittings only for the number and position of its own male pins 158 which draw the electric current.

In order to offer a sure guarantee against accidents and as machine protection, the plug 144 is provided with a bulkhead 157 separating the zone of the electric connections from the zone of the steam connection to avoid steam leakages causing short-circuits between the electric polarities. A further safety device is represented by a bipolar microswitch 159 which applies voltage to the female plug 160 of the machine only after a proper insertion of the plug 144 and the latter has established contemporarily the correct coupling between the steam tubes. If the user fitting is that of a smoothing iron, its connection with the steam generator is obtained exclusively through a flexible sheath 143 (FIG. 4) and controlled by a pushbutton operated microswitch controlling the aperture of the electrovalve 138 only by a specific maneuver.

Figure 2:
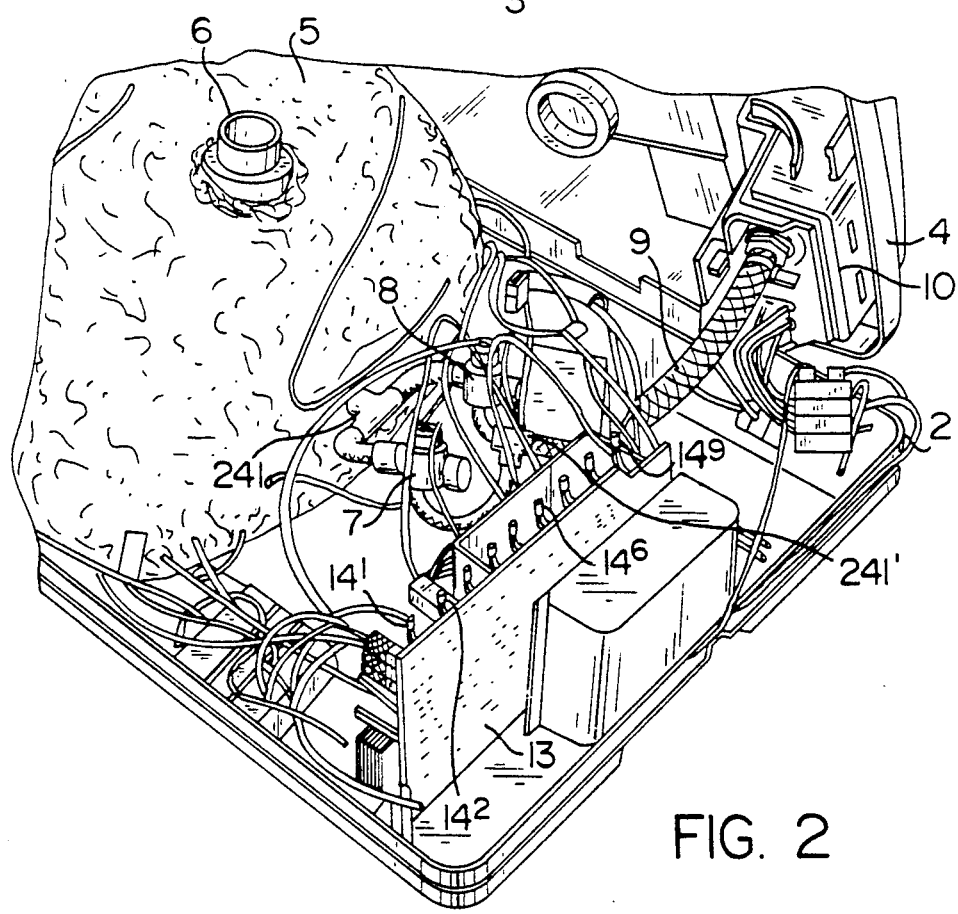
FIG. 2 is a partial view of the generator with its cover open.
Figure 3:
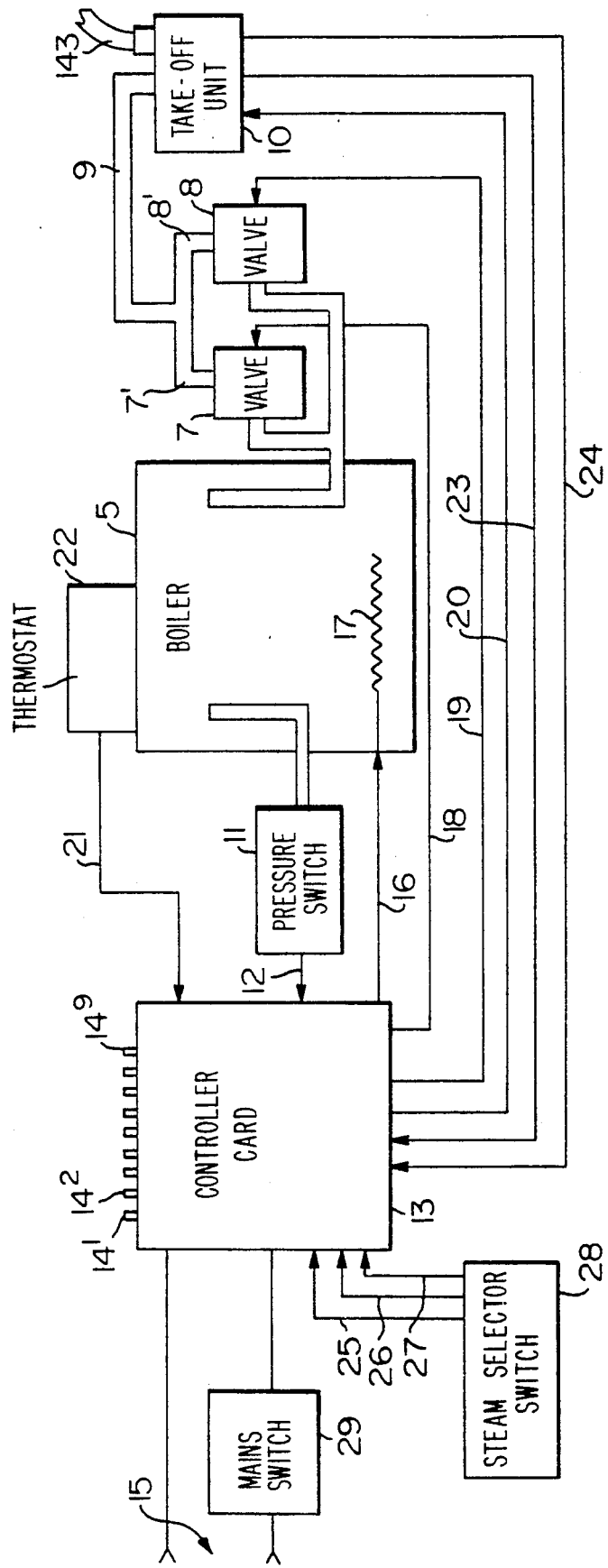
FIG. 3 is a block diagram of the generator.

Returning to FIGS. 2, 3, and 6, to the boiler 5 of the present invention there are connected a first solenoid valve 7 and a second solenoid valve 8, the two outlets of which, 7' and 8' respectively, are connected to a single pipe 9 with which there is associated a steam and energy take-off unit 10, to which the appliances and relative controls, such as a smoothing iron, are connected as required. There is also connected to the boiler 5 a hysteresis-free pressure switch or equivalent, 11, the output 12 of which is connected to an electronic control card 13, the functions of which are displayed by a plurality of LEDs $14^1$, $14^2$, ... $14^9$, and which is powered by the mains 15.

The output 16 of the card 13 controls the resistance element 17, the output 18 controls the solenoid valve 7, the output 19 controls the solenoid valve 8 and the output 20 is associated with the take-off 10. The input 21 to the card 13 is associated with the thermostat 22 provided on the boiler 5, the inputs 23, 24, of low voltage and isolated from the mains, are associated with the take-off unit 10, and the inputs 25, 26 and 27 are associated with a steam selector switch 28.

In operation, having filled the boiler 5 with the scheduled quantity of water, the user operates a mains switch 29 and then selects the type of operation by setting the switch 28 (steam OFF, steam ON with 100% of energy, steam ON with 50% of energy, economizer operation and/or humidification).

In the described example of operation it will be assumed that 100% ON operation has been selected. In this case on operating the switch 28 the LED $14^9$ lights to indicate this selection, and the resistance element 17 is fed with 100% of its power, to consequently commence steam production. During this initial stage the LED $14^8$ also lights to indicate a steam pressure which is too low for use.

When the pressure in the boiler 5 reaches the working value the LED $14^8$ is extinguished and the LED $14^7$ lights to indicate that the working pressure has been reached. As heating continues, the maximum allowable working pressure is reached, as measured by the pressure switch 11, and the LED $14^6$ light jointly with the LED $14^7$. The lighting of the LED $14^6$ causes the resistance element 17 to be switched off.

The pressure in the boiler 5 is regulated by the hysteresis-free pressure switch 11, which measures it with maximum precision due to the lack of system hysteresis.

From the time the LED $14^7$ lights, the generator is ready for use, and the user by operating the switches associated with the inputs 23 and 24 can select three different steam loads (four including "off") via the take-off unit 10, as follows: by operating the switch associated with the input 23 he activates the solenoid valve 7 and lights the LED $14^3$ to indicate minimum steam withdrawal (e.g. 30%), by operating the switch associated with the input 24 he activates the solenoid valve 8 and lights the LEDs and $14^4$ and $14^5$ to indicate medium steam withdrawal (e.g. 70%), and by operating the switches associated with the inputs 23 and 24 simultaneously, he activates both the solenoid valves 7 and 8 and lights the LEDs $14^3$, $14^4$, and $14^5$ to indicate maximum steam withdrawal (e.g. 100%). The operating switch (not shown) for making these selections can be conveniently located at the user end of the flexible sheath 143 and the electrical connection through pins 158 to controller card 13.

Figure 6:
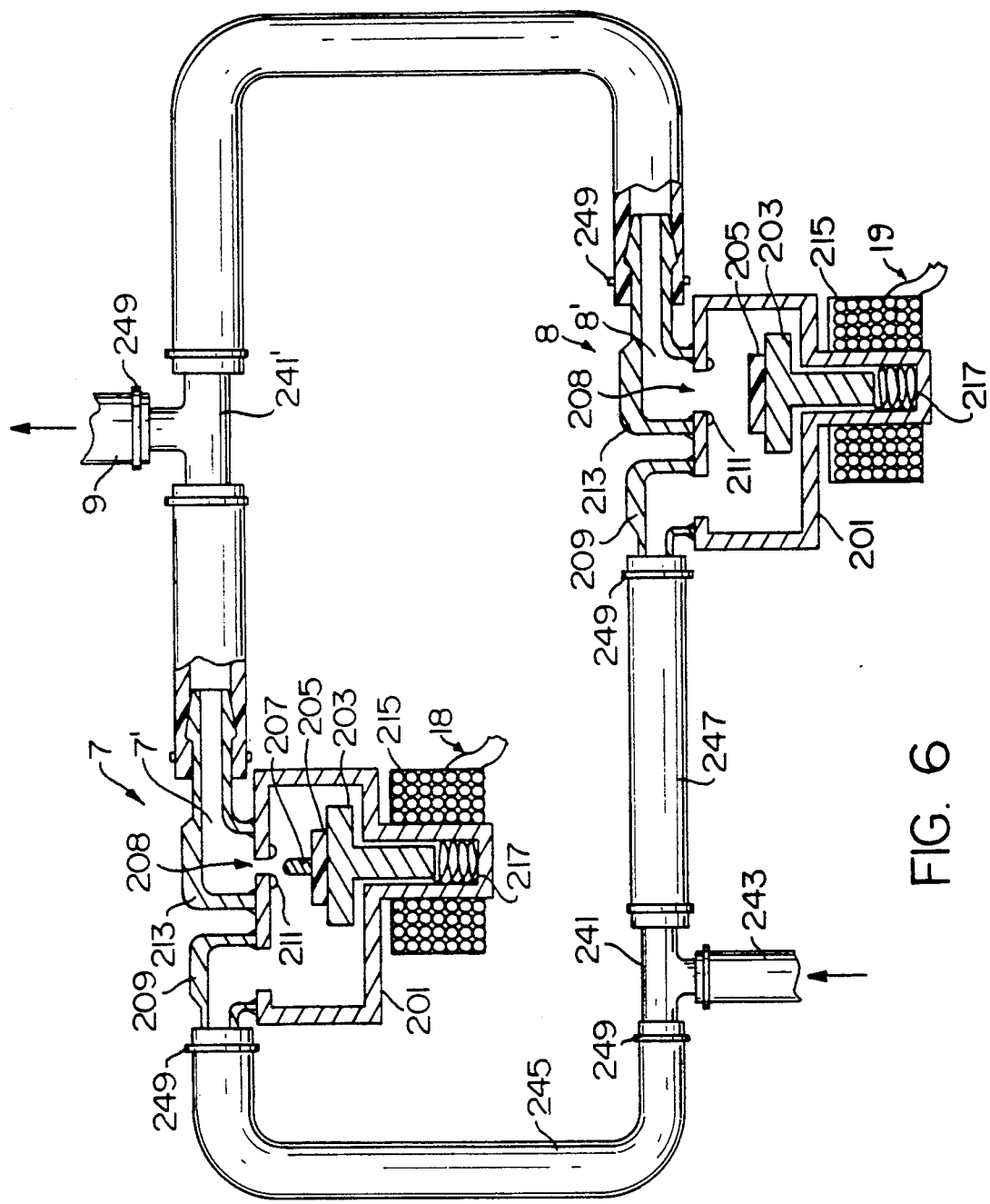
FIG. 6 shows the connections and steam paths for the different operating modes of the invention.

FIG. 6 shows, in partial cross-section, the connections and inner workings of valves 7 and 8. The two valves operate substantially identically, except that valve 7 includes a self-cleaning device, while the output of valve 8 is large enough to not require one.

Using like numerals for like components in valves 7 and 8, each valve contains a housing 201 with a large inlet 209, and a small outlet 208 for valve 7, and a larger outlet 208' for valve 8. As previously indicated, the steam flow through the two valves are such that, when valve 7 is open, a small amount of steam is permitted to pass therethrough, and when valve 8 is open, a larger amount than that of valve 7 is permitted to flow therethrough. Both valves operate independently and are controlled by the electronic control card 13 which energizes or deenergizes a solenoid coil 215 which magnetically pulls the shank of plunger 203 against spring 217 lodged in the rear of the housing 201. Without electrical energy applied, the magnetic hold on plunger 203 is released, and compression spring 217 forces the plunger to close the outlet of the valve. For a complete seal of the valve outlet 208, a soft rubber or plastic washer 205 is provided at the end of plunger 203 and, when the valve is closed, presses against seat 211 which may be a raised annular rib around outlet 208, 208'.

Because valve 7 is designed to pass only a small amount of steam, the output opening 208 is very small and can be occluded by the calcareous deposits in the water used to produce the steam. Valve 7 thus includes a means to clean valve opening from such calcareous deposits so as to be self-cleaning. The cleaning means includes a small plunger or needle fixed to the plunger 203, the former passing through the valve opening when the valve plunger closes it, thus cleaning the opening against the accumulation of deposits. Valve 8, having an output opening with a larger size does not suffer this shortcoming, and no self-cleaning device is shown.

Connections to valves 7 and 8 are by standard means using, for example, high temperature plastic tubing which would include a source tube 243 from the steam generator, a tube 245 leading to the input valve connection 209 of valve 7, and a tube 247 leading to the inlet connection 209 of valve 8. A "T" connector 241 interconnects the three-mentioned tubes, and a seal at the points of connection of the tubes can be made by any appropriate clamp or strap 249. A second "T" 241' is shown to connect the outputs of the two valves together leading to the summed output conduit or tube 9.

With continued steam withdrawal, the water in the boiler 5 will ultimately be completely consumed, with consequent temperature rise as measured by the thermostat 22, which lights the flashing LED $14^2$ and disconnects the resistance element 17. If this situation persists beyond a certain predetermined time, power is switched off to the system. Reactivation can only be done by switching off and switching on the switch 29.

If electrical energy is also withdrawn from the take-off unit via the output 20, for example for the smoothing iron, the card 13 automatically reduces the energy to the resistance element 17 proportionally, to maintain the electrical energy consumption of the generator constant. This means that the installed electrical system can present a power load which simulates normal use, i.e. there are no sudden excessive load changes.

If the 50% ON function is selected, for example for operating the system as a humidifier, the LED $14^9$ lights with 50% brightness to indicate this selection, while the other functions remain unaltered. The 50% mode (i.e. the economizer operation functions independently of the steam rate selection made at the take-off unit 10. That is, the proportions of steam output determined by the operation of valves 7 and 8 are effective whether 100% energy is applied or 50% energy is applied to the boiler 5.

If the generator 1 is to be used without steam, the switch 28 is put in the steam OFF position. The LED $14^9$ will therefore not light, so indicating this selection, and only electrical energy will be available at the take-off unit 10 via the output 20 of the card 13, for example to allow a smoothing iron to be used dry. The LED $14^1$ associated with the switch 29 lights to indicate that the generator 1 is powered.

I claim:
1. A steam generator appliance, for domestic and industrial use, for supplying steam and electrical power to an external user item, said steam generator appliance comprising:
 a boiler provided with a resistance heater element coupled to a source of electrical power for heating water in said boiler, thereby generating steam;
 a steam and electrical power take-off unit coupled to said boiler and to said source of electrical power for supplying the external user item with steam from said boiler and power from said electrical power source;
 at least two solenoid valves including a first solenoid valve for passing steam from said boiler to said take-off unit, when activated, at a first rate, and second solenoid valve for passing steam from said boiler to said take-off unit, when activated, at a second rate greater than said first rate, said first and second solenoid valves being connected between said boiler and said take-off unit;
 switch means on said take-off unit for selectively activating said solenoid valves to develop four output steam rates from said take-off unit, depending upon whether neither, one of said solenoid valves, the other of said solenoid valves, or both of said solenoid valves are activated; and
 an electronic controller coupled to said resistance heater element, said steam and electrical power take-off unit, said electrical power source, said solenoid valves and said switch means for controlling the activation of said solenoid valves and for automatically and proportionally exchanging electrical power applied to said resistance element with electrical power applied to the external user item, thereby effectively exchanging the amount of steam available for use by, and the electrical power applied to, the external user item.

* * * * *